(12) United States Patent
Tsuchida et al.

(10) Patent No.: US 9,391,328 B2
(45) Date of Patent: Jul. 12, 2016

(54) COMPOSITE POSITIVE ELECTRODE ACTIVE MATERIAL, ALL SOLID-STATE BATTERY, AND METHODS FOR MANUFACTURE THEREOF

(75) Inventors: Yasushi Tsuchida, Susono (JP); Toshihiro Seguchi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 507 days.

(21) Appl. No.: 13/641,602

(22) PCT Filed: Apr. 21, 2011

(86) PCT No.: PCT/IB2011/000866
§ 371 (c)(1),
(2), (4) Date: Oct. 16, 2012

(87) PCT Pub. No.: WO2011/132065
PCT Pub. Date: Oct. 27, 2011

(65) Prior Publication Data
US 2013/0040193 A1 Feb. 14, 2013

(30) Foreign Application Priority Data
Apr. 23, 2010 (JP) ................................. 2010-099837

(51) Int. Cl.
*H01M 4/58* (2010.01)
*C01G 51/00* (2006.01)
(Continued)

(52) U.S. Cl.
CPC ............ *H01M 4/5825* (2013.01); *C01G 51/42* (2013.01); *H01M 4/0471* (2013.01);
(Continued)

(58) Field of Classification Search
None
See application file for complete search history.

(56) References Cited

U.S. PATENT DOCUMENTS

| | | | |
|---|---|---|---|
| 5,500,291 A * | 3/1996 | Minami et al. | 429/206 |
| 2009/0068563 A1 | 3/2009 | Kanda et al. | |

(Continued)

FOREIGN PATENT DOCUMENTS

| | | |
|---|---|---|
| DE | 19735803 A1 | 2/1999 |
| EP | 2037527 A1 | 3/2009 |

(Continued)

OTHER PUBLICATIONS

Ohta et al., "LiNbO$_3$-coated LiCoO$_2$ as Cathode Material for all Solid-State Lithium Secondary Batteries," *Electrochemistry Communications*, vol. 9, No. 7, Jun. 15, 2007, pp. 1486-1490.

(Continued)

*Primary Examiner* — Patrick Ryan
*Assistant Examiner* — Carmen Lyles-Irving
(74) *Attorney, Agent, or Firm* — Benjamin S. Prebyl

(57) ABSTRACT

A composite positive electrode active material includes: a positive electrode active material which includes a transition metal; and a reaction suppressor which is formed so as to cover a surface of the positive electrode active material, and which is made of a polyanion structure-containing compound having a cation moiety composed of a metal atom that becomes a conducting ion and having a polyanion structural moiety composed of a center atom that is covalently bonded to a plurality of oxygen atoms. A transition metal-reducing layer which has self-assembled on the surface of the positive electrode active material in contact with the reaction suppressor owing to reaction of the transition metal with the polyanion structure-containing compound, has a thickness of 10 nm or less.

15 Claims, 3 Drawing Sheets

(51) Int. Cl.

| | | |
|---|---|---|
| *H01M 4/1391* | (2010.01) | |
| *H01M 4/36* | (2006.01) | |
| *H01M 4/485* | (2010.01) | |
| *H01M 10/0525* | (2010.01) | |
| *H01M 10/0562* | (2010.01) | |
| *H01M 4/13* | (2010.01) | |
| *H01M 4/04* | (2006.01) | |
| *H01M 4/525* | (2010.01) | |
| *H01M 4/02* | (2006.01) | |

(52) U.S. Cl.
CPC .......... *H01M 4/1391* (2013.01); *H01M 4/364* (2013.01); *H01M 4/485* (2013.01); *H01M 10/0525* (2013.01); *H01M 10/0562* (2013.01); *C01P 2004/80* (2013.01); *C01P 2006/40* (2013.01); *H01M 4/043* (2013.01); *H01M 4/13* (2013.01); *H01M 4/525* (2013.01); *H01M 2004/028* (2013.01); *Y02E 60/122* (2013.01); *Y02P 70/54* (2015.11); *Y10T 428/269* (2015.01)

(56) References Cited

U.S. PATENT DOCUMENTS

| | | |
|---|---|---|
| 2009/0081554 A1 | 3/2009 | Takada et al. |
| 2010/0151335 A1 | 6/2010 | Senga et al. |
| 2011/0045355 A1 | 2/2011 | Ichikawa |
| 2012/0052396 A1 | 3/2012 | Tsuchida et al. |

FOREIGN PATENT DOCUMENTS

| | | |
|---|---|---|
| JP | H08138724 A | 5/1996 |
| JP | H08195219 A | 7/1996 |
| JP | 2000-340261 A | 12/2000 |
| JP | 2001-052733 A | 2/2001 |
| JP | A-2003-173770 | 6/2003 |
| JP | A-2005-228570 | 8/2005 |
| JP | 2008-027581 A | 2/2008 |
| JP | 2008-103146 | 5/2008 |
| JP | 2008-103282 A | 5/2008 |
| JP | 2009-245913 A | 10/2009 |
| JP | A-2010-135090 | 6/2010 |
| JP | 2011-065982 A | 3/2011 |
| WO | 2006/138362 A2 | 12/2006 |
| WO | WO 2007/004590 A1 | 1/2007 |
| WO | WO 2009/104069 A1 | 8/2009 |
| WO | WO 2010/064127 A1 | 6/2010 |

OTHER PUBLICATIONS

Kobayashi et al., "Development of High-Voltage and High-Capacity All-Solid-State Lithium Secondary Batteries," *Journal of Power Sources*, vol. 146, No. 1-2, Aug. 26, 2005, pp. 719-722.
Jan. 5, 2015 Office Action issued in U.S. Appl. No. 13/131,764.
May 30, 2014 Office Action issued in U.S. Appl. No. 13/131,764.
Apr. 23, 2015 Office Action issued in U.S. Appl. No. 13/131,764.
Feb. 23, 2010 International Search Report issued in International Application No. PCT/IB2009/007634.
Feb. 23, 2010 Written Opinion issued in International Application No. PCT/IB2009/007634.
T. Minami et al., "Recent progress of glass and glass-ceramics as solid electrolytes for lithium secondary batteries," Solid State Ionics 177 (2006) 2715-2720.
K. Takada et al., "Solid-state lithium battery with graphite anode," Solid State Ionics 158 (2003) 269-274.
K. Hirai et al., "29Si and 31P MAS-NMR Spectra of Li2S-SiS2-Li3PO4 Rapidly Quenched Glasses," Journal of the American Ceramic Society, 79(3) (1996), 349-352.
H. Miyashiro, et al., "All-solid-state lithium polymer secondary battery with LiNi0.5Mn1.5PO4 by mixing go Li3PO4," Electrochemistry Communications 7 (2005) 1083-1086.
A. Sakuda "All-solid-state lithium secondary batteries with oxide-coated LiCoO2 electrode and Li2S-P2S5 electrolyte," Journal of Power Sources 189 (2009) 527-530.
S. Seki, et al., "Fabrication of High-Voltage, High-Capacity All-Solid-State Lithium Polymer Secondary Batteries by Application of the Polymer Electrolyte/Inorganic Electrolyte Composite Concept," Chemistry of Materials 17 (2005) 2041-2045.
Y. Kobayashi, et al., "High-Performance Genuine Lithium Polymer Battery Obtained by Fine-Ceramic-Electrolyte Coating of LiCoO2," Journal of the Electrochemical Society 152(10) (2005) 2041-2045.
Y. Kobayashi, et al., "High-Performance Genuine Lithium Polymer Battery Obtained by Fine-Ceramic-Electrolyte Coating of LiCoO2," Journal of the Electrochemical Society 152 (2005) pp. A1985-A1988.
Jul. 2, 2015 Office Action issued in U.S. Appl. No. 13/131,764.
Apr. 7, 2016 Office Action issued in U.S. Appl. No. 13/131,764.

* cited by examiner

COMPOSITE POSITIVE ELECTRODE ACTIVE MATERIAL, ALL SOLID-STATE BATTERY, AND METHODS FOR MANUFACTURE THEREOF

BACKGROUND OF THE INVENTION

1. Field of the Invention

The invention relates to a composite positive electrode active material which, when used in an all solid-state battery; is able to reduce the interfacial resistance with a solid electrolyte material. The invention further relates to an all solid-state battery which uses such a composite positive electrode active material, and to methods of manufacturing the composite positive electrode active material and the all solid-state battery.

2. Description of Related Art

Among the wide variety of batteries that exist, lithium batteries have the special advantage of being lightweight while having a high output and high energy density. For this reason, they are widely used as a power supply for small, portable electronic devices and Personal Digital Assistants (PDAs), and help support today's information-driven society. Lithium batteries are also being considered as a power supply for electric cars and hybrid vehicles. Hence, there exists a desire for even higher energy density, improved safety and larger sizes in lithium batteries.

Because lithium batteries now on the market use organic electrolytes which contain flammable organic solvents, such batteries require safety devices to suppress a rise in temperature at the time of a short circuit and improvements in construction and materials to prevent short circuits. By contrast, all solid-state batteries in which the liquid electrolyte has been replaced with a solid electrolyte layer, making the battery entirely solid state, do not use a flammable organic solvent within the battery. As a result, the safety devices can be simplified, helping to hold down production costs and ensure excellent productivity.

In the field of such all solid-state batteries, efforts are being made to improve the performance of the all solid-state battery by focusing attention on the interface between the positive electrode active material and the solid electrolyte material. For example, a material composed of $LiCoO_2$ (positive electrode active material) which is coated on the surface thereof with $LiNbO_3$ is disclosed in "Narumi Ohta et al. "$LiNbO_3$-coated $LiCoO_2$ as cathode material for all solid-state lithium secondary batteries," *Electrochemistry Communications* 9 (2007), 1486-1490". This technology attempts to provide the battery with a higher output by coating $LiNbO_3$ onto the surface of $LiCoO_2$ and thereby lowering the interfacial resistance of $LiCoO_2$ and the solid electrolyte material. Also, WO 2007/004590 discloses a solid-state battery which uses a positive electrode active material that has been surface-coated with a lithium ion-conductive oxide. This attempts to increase the battery output by covering the surface of the positive electrode active material with a lithium ion-conducting oxide and thereby suppressing the formation of a high-resistance layer at the interface between the positive electrode active material and a sulfide solid electrolyte material.

As mentioned in "Narumi Ohta et al, "$LiNbO_3$-coated $LiCoO_2$ as cathode material for all solid-state lithium secondary batteries," *Electrochemistry Communications* 9 (2007), 1486-1490", by coating $LiNbO_3$ onto the surface of $LiCoO_2$, it is possible at an initial stage to reduce the interfacial resistance between the positive electrode active material and the solid electrolyte material. However, the interface resistance ultimately rises with the passage of time.

The inventor, upon investigating this, has found that the rise over time in the interfacial resistance is caused by the fact that the $LiNbO_3$ reacts with the positive electrode active material and the solid electrolyte material with which it is in contact, giving rise to reaction products that end up acting as a high-resistance layer. This is believed to be the reason why $LiNbO_3$ has a relatively low electrochemical stability. The inventor then discovered that, when a compound having a polyanion structural moiety with covalent bonds is used instead of $LiNbO_3$, such a compound substantially does not react with the positive electrode active material and the solid electrolyte material.

However, even in cases where a compound having such a polyanion structural moiety is used, if the positive electrode active material contains a transition metal, the interfacial resistance sometimes rises. In WO 2007/004590, a solid battery which uses $LiMnO_4$ as the positive electrode active material and $LiTi_2(PO_4)_3$ as the lithium ion-conducting oxide is disclosed (see Example 2 of WO 2007/004590). However, because the positive electrode active material includes a transition metal, there is a possibility that the interfacial resistance will rise.

SUMMARY OF THE INVENTION

Accordingly, one object of the invention is to provide a composite positive electrode active material which, when used in an all solid-state battery, is able to reduce the interfacial resistance with the solid electrolyte material. A further object of the invention is to provide an all solid-state battery which uses such a composite positive electrode active material. Still further objects of the invention are to provide a method for manufacturing such a composite positive electrode active material and a method for manufacturing such an all solid-state battery.

This invention was conceived based on the discovery by the inventor that, when the polyanion structural moiety and the transition metal at the surface of the positive electrode active material come into mutual contact at an elevated temperature, compared with the valence of the transition metal at the interior (bulk portion) of the positive electrode active material interior, the valence of the transition metal at the surface of the positive electrode active material decreases, and that the interfacial resistance rises due to the presence of a region where the transition metal has a decreased valence (transition metal-reducing layer).

In a first aspect, the invention provides a composite positive electrode active material having: a positive electrode active material which includes a transition metal; and a reaction suppressor which is formed so as to cover a surface of the positive electrode active material, and which is made of a polyanion structure-containing compound having a cation moiety composed of a metal atom that becomes a conducting ion and having a polyanion structural moiety composed of a center atom that is covalently bonded to a plurality of oxygen atoms. In the composite positive electrode active material, a transition metal-reducing layer which has self-assembled on the surface of the positive electrode active material in contact with the reaction suppressor owing to reaction of the transition metal with the polyanion structure-containing compound, has a thickness of 10 nm or less.

In the composite positive electrode active material according to this aspect of the invention, because the transition metal-reducing layer formed on the surface of the positive electrode active material in contact with the reaction suppressor has been made thin to a predetermined thickness or less, the interfacial resistance between the reaction suppressor and the positive electrode active material can be decreased. When such a composite positive electrode active material is used in an all solid-state battery, the interfacial resistance between the composite positive electrode active material and the solid electrolyte material can be decreased. Moreover, because the reaction suppressor that has been formed so as to cover the surface of the positive electrode active material is composed of a polyanion structure-containing compound having a high electrochemical stability, the reaction suppressor is able to suppress the reaction of the positive electrode active material with the high-resistance layer-forming solid electrolyte material which reacts with the positive electrode active material to form a high-resistance layer. By thus using the composite positive electrode active material of this aspect of the invention in an all solid-state battery, it is possible to suppress an increase over time in the interfacial resistance between the positive electrode active material and the solid electrolyte material. The polyanion structural moiety of the polyanion structure-containing compound is thought to have an increased electrochemical stability because it has a center atom which is covalently bonded with a plurality of oxygen atoms.

In the composite positive electrode active material according to this aspect of the invention, the positive electrode active material may be an oxide positive electrode active material. This makes it possible to obtain an all solid-state battery having a high energy density.

In the composite positive electrode active material according to this aspect of the invention, the center atom of the polyanion structural moiety may have an electronegativity of 1.74 or more. This makes it possible to form more stable covalent bonds.

In the composite positive electrode active material according to this aspect of the invention, the polyanion structural moiety may be at least one selected from the group consisting, of $PO_4^{3-}$, $SiO_4^{4-}$, $GeO_4^{4-}$ and $BO_3^{3-}$. Moreover, in the composite positive electrode active material according to this aspect of the invention, the polyanion structural moiety may be at least one selected from the group consisting of $PO_4^{3-}$ and $SiO_4^{4-}$. This makes it possible to effectively suppress an increase in the interfacial resistance over time.

In the composite positive electrode active material according to this aspect of the invention, the reaction suppressor may be made of a non-crystalline polyanion structure-containing compound. By using a non-crystalline polyanion structure-containing compound in the reaction suppressor, a thin, uniform reaction suppressor can be formed, increasing the coverage and thus making it possible to fully exhibit the effects according to the first aspect of the invention. Moreover, because the non-crystalline polyanion structure-containing compound has a high ionic conductivity, when the composite positive electrode active material according to this aspect of the invention is used in an all solid-state battery, a higher battery output can be achieved.

In the composite positive electrode active material according to this aspect of the invention, the cation moiety may be $Li^+$. This makes it possible to obtain an all solid-state lithium battery useful in various applications.

In the composite positive electrode active material according to this aspect of the invention, the reaction suppressor may have a thickness in a range of from 1 nm to 500 nm. When a composite positive electrode active material according to this aspect of the invention is used in an all solid-state battery, if the thickness of the reaction suppressor is too small, there is a possibility that the positive electrode active material will react with the solid electrolyte material. On the other hand, if the thickness of the reaction suppressor is too large, there is a possibility that the ionic conductivity will decrease. These problems can be overcome when the reaction suppressor has a thickness in the above-indicated range.

In the composite positive electrode active material according to this aspect of the invention, the reaction suppressor which covers the surface of the positive electrode active material has a coverage of 50% or more. By covering most of the surface of the positive electrode active material, the advantageous effects of the first aspect of the invention can be fully achieved.

In a second aspect, the invention provides an all solid-state battery having; a positive electrode active material layer; a negative electrode active material layer; and a solid electrolyte layer formed between the positive electrode active material layer and the negative electrode active material layer. The positive electrode active material layer includes the composite positive electrode active material according to the above-described first aspect of the invention, this composite positive electrode active material being in contact with a high-resistance layer-forming solid electrolyte material which reacts with the positive electrode active material so as to form a high-resistance layer.

Because the all solid-state battery according to this aspect of the invention uses the composite positive electrode active material according to the above first aspect of the invention, the interfacial resistance between the composite positive electrode active material and the solid electrolyte material can be lowered, enabling a high-output all solid-state battery to be obtained. Moreover, because the battery has, at the interface between the positive electrode active material and the high-resistance layer-forming solid electrolyte material, a reaction suppressor composed of a polyanion structure-containing compound having a high electrochemical stability, an increase over time in the interfacial resistance between the positive electrode active material and the solid electrolyte material can be suppressed, enabling an all solid-state battery having an excellent durability to be obtained.

In the all solid-state battery according to this aspect of the invention, the high-resistance layer-forming solid electrolyte material may include a crosslinked chalcogen. In this way, the crosslinked chalcogen-containing high resistance layer-forming solid electrolyte material has a high ionic conductivity, enabling a higher battery output to be achieved.

In the all solid-state battery according to this aspect of the invention, the crosslinked chalcogen may be crosslinked sulfur or crosslinked oxygen. This enables the solid electrolyte material to be endowed with an excellent ionic conductivity.

In a third aspect, the invention provides a method for manufacturing a composite positive electrode active material having a positive electrode active material which includes a transition metal, and a reaction suppressor which is formed so as to cover a surface of the positive electrode active material and which is made of a polyanion structure-containing compound having a cation moiety composed of a metal atom that becomes a conducting ion and having a polyanion structural moiety composed of a center atom that is covalently bonded to a plurality of oxygen atoms. The method includes: preparing a reaction suppressor-forming coating solution which includes a hydrolyzable metal compound having the cation moiety and a compound having the polyanion structural moiety; covering the surface of the positive electrode active material with the reaction suppressor-forming coating solution; and heat-treating, at a temperature of 300° C. or less, the positive electrode active material whose surface has been covered with the reaction suppressor-forming coating solution so as to form the reaction suppressor.

In the method for manufacturing a composite positive electrode active material according to this aspect of the invention, by forming, through heat treatment at a predetermined temperature, a reaction suppressor so as to cover the surface of the positive electrode active material, the transition metal-reducing layer that has formed on the surface of the positive electrode active material in contact with the reaction suppressor can be made thin, making it possible to obtain a composite positive electrode active material that can reduce the interfacial resistance between the reaction suppressor and the positive electrode active material. When the composite positive electrode active material obtained according to the first aspect of the invention is thus used in an all solid-state battery, the interfacial resistance between the composite positive electrode active material and the solid electrolyte material can be reduced. Also, because the surface of the positive electrode active material is covered by a reaction suppressor composed of a polyanion structure-containing compound having a high electrochemical stability, by using the composite positive electrode active material obtained according to this aspect of the invention in an all solid-state battery, an increase over time in the interfacial resistance between the positive electrode active material and the solid electrolyte material can, be suppressed.

In a fourth aspect, the invention provides a method for manufacturing an all solid-state battery having a positive electrode active material layer, a negative electrode active material layer, and a solid electrolyte layer formed between the positive electrode active material layer and the negative electrode active material layer. The method includes: forming the positive electrode active material layer by using a composition which includes the composite positive electrode active material produced by the composite positive electrode active material manufacturing method according to the above-described third aspect of the invention.

In the method for manufacturing an all solid-state battery according to third aspect of the invention, by using a composite positive electrode active material obtained by the method for manufacturing a composite positive electrode active material according to the above-described third aspect of the invention, the interfacial resistance between the composite positive electrode active material and the solid electrolyte material can be reduced, enabling a high-power all solid-state battery to be obtained. Moreover, an increase over time in the interfacial resistance between the positive electrode active material and the solid electrolyte material can be suppressed, enabling an all solid-state battery having an excellent durability to be obtained.

In this invention, as described in the above first to fourth aspects, there can be obtained a composite positive electrode active material which, when used in an all solid-state battery, is able to reduce the interfacial resistance with a solid electrolyte material; an all solid-state battery using such a composite positive electrode active material; a method for manufacturing such a composite positive electrode active material; and a method for manufacturing such an all solid-state battery.

BRIEF DESCRIPTION OF THE DRAWINGS

Features, advantages, and the technical and industrial significance of exemplary embodiments of the invention will be described below with reference to the accompanying drawings, in which like numerals denote like elements, and wherein.

DETAILED DESCRIPTION OF EMBODIMENTS

Embodiments of the inventive composite positive electrode active material, all solid-state battery, method for manufacturing a composite positive electrode active material and method for manufacturing an all solid-state battery are described below in detail.

(A. Composite Positive Electrode Active Material)

First, an embodiment of the composite positive electrode active material of the invention is described. The inventive composite positive electrode active material is a composite positive electrode active material composed of a transition metal-including positive electrode active material and a reaction suppressor which is formed so as to cover a surface of the positive electrode active material and which is made of a polyanion structure-containing compound having a cation moiety composed of a metal atom that becomes a conducting ion and having a polyanion structural moiety composed of a center atom that is covalently bonded to a plurality of oxygen atoms. The composite positive electrode active material is characterized in that a transition metal-reducing layer which has, self-assembled on the surface of the positive electrode active material in contact with the reaction suppressor, and owing to reaction of the transition metal with the polyanion structure-containing compound, has a thickness of 10 nm or less.

Figure 1:
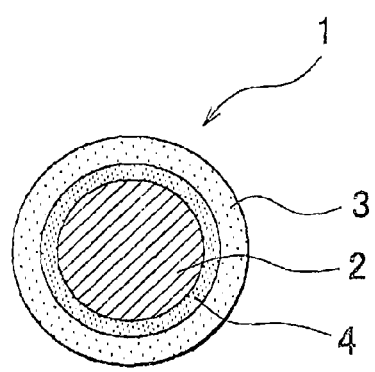
FIG. 1 is a schematic cross-sectional view showing an embodiment of the composite positive electrode active material according to the invention.

FIG. 1 is a schematic cross-sectional view showing an embodiment of the composite positive electrode active material according to the invention. The composite positive electrode active material 1 shown in FIG. 1 has a positive electrode active material 2 and a reaction suppressor 3 formed so as to cover the surface of the positive electrode active material 2. In FIG. 1, the reaction suppressor 3 is composed of a polyanion structure-containing compound (e.g., $Li_3PO_4$), and a transition metal-reducing layer 4 having a thickness of 10 nm or less has formed on the surface of the positive electrode active material 2 in contact with the reaction suppressor 3. Here, as shown below, $Li_3PO_4$ has a cation moiety ($Li^+$) composed of lithium atoms and a polyanion structural moiety composed of a phosphorus atom covalently bonded to a plurality of oxygen atoms ($PO_4^{3-}$).

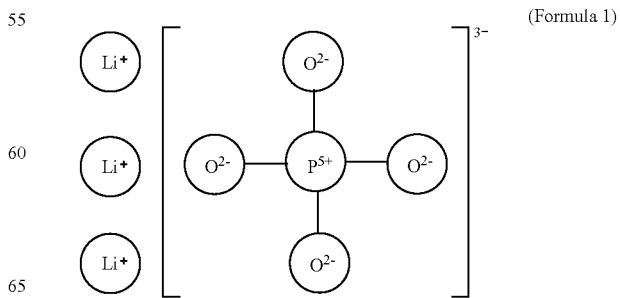

(Formula 1)

In this embodiment, because the transition metal-reducing layer formed on the surface of the positive electrode active material in contact with the reaction suppressor has a thickness of a predetermined thickness or less, the interfacial resistance between the reaction suppressor and the positive electrode active material can be reduced, thus making it possible to reduce the interfacial resistance between the composite positive electrode active material and the solid electrolyte material when the composite positive electrode active material of this embodiment is used in an all solid-state battery. Moreover, because the reaction suppressor composed of a polyanion structure-containing compound having a high electrochemical stability has been formed so as cover the surface of the positive electrode active material, by using the composite positive electrode active material of this embodiment in an all solid-state battery, the increase over time in the interfacial resistance between the positive electrode active material and the solid electrolyte material can be suppressed. Because the polyanion structural moiety of the polyanion structure-containing compound has a center atom which is covalently bonded with a plurality of oxygen atoms, the electrochemical stability appears to increase. The composite positive electrode active material of this embodiment is described below component by component.

(1. Positive Electrode Active Material)

First, the positive electrode active material in the present embodiment is described. The positive electrode active material in this embodiment includes a transition metal, and varies depending on the type of conducting ion in the target all solid-state battery. For example, in cases where the composite positive electrode active material of this embodiment is used in an all solid-state lithium secondary battery, the positive electrode active material inserts and extracts lithium ions. The positive electrode active material in this invention generally reacts with the subsequently described solid electrolyte material (high-resistance layer-forming solid electrolyte material) to form a high-resistance layer.

The positive electrode active material in this embodiment is not subject to any particular limitation, provided it includes a transition metal and reacts with a high resistance layer-forming solid electrolyte material to form a high-resistance layer. For example, it may be an oxide positive electrode active material. By using an oxide positive electrode active material, an all solid-state battery having a high energy density may be obtained. In cases where the composite positive electrode active material of this embodiment is used in an all solid-state lithium battery, examples of oxide positive electrode active materials that may be used include positive electrode active materials of the general formula $Li_xM_yO_z$ (wherein M is a transition metal atom, x is from 0.02 to 2.2, y is from 1 to 2, and z is from 1.4 to 4). In the above general formula, M is preferably at least one selected from the group consisting of cobalt, manganese, nickel, vanadium and iron, and more preferably at least one selected from the group consisting of cobalt, nickel and manganese. Illustrative examples of such oxide positive electrode active materials include $LiCoO_2$, $LiMnO_2$, $LiNiO_2$, $LiVO_2$, $LiNi_{1.3}Co_{1.3}Mn_{1.3}O_2$, $LiMn_2O_4$, $Li(Ni_{0.5}Mn_{1.5})O_4$, $Li_2FeSiO_4$ and $Li_2MnSiO_4$. Examples of positive electrode active materials other than those of general formula $Li_xM_yO_z$ include olivine-type positive electrode active materials such as $LiFePO_4$ and $LiMnPO_4$.

The positive electrode active material may be in, for example, a particulate form. Of these, spherical or spheroidal particles are preferred. In cases where the positive electrode active material is in a particulate form, the average particle size is preferably within a range of from 0.1 μm to 50 μm.

(2. Reaction Suppressor)

Next, the reaction suppressor in the present embodiment is described. The reaction suppressor in this embodiment is formed so as to cover the surface of the positive electrode active material, and is made up of a polyanion structure-containing compound having a cation moiety composed of a metal atom which becomes a conducting ion and a polyanion structural moiety composed of a center atom which is covalently bonded to a plurality of oxygen atoms. The reaction suppressor has the function of suppressing reactions between the positive electrode active material and the high-resistance layer-forming solid electrolyte material that arise during battery use. Because the polyanion structure-containing compound making up the reaction suppressor has a high electrochemical stability compared with common niobium oxides (e.g., $LiNbO_3$), an increase over time in the interfacial resistance can be suppressed.

The polyanion structure-containing compound making up the reaction suppressor is now described. The polyanion structure-containing compound in this embodiment generally has a cation moiety composed of a metal atom which becomes a conducting ion, and a polyanion structural moiety composed of a center atom covalently bonded with a plurality of oxygen atoms.

The metal atom in the cation moiety will differ according to the type of all solid-state battery in which the composite positive electrode active material of this embodiment is used. Illustrative examples include alkali metal atoms such as lithium and sodium, and alkaline earth metal atoms such as magnesium and calcium. Of these, an alkali metal atom is preferred, and lithium is especially preferred. That is, in the present embodiment, the cation moiety is preferably $Li^{30}$, the reason being that an all solid-state lithium battery useful in various applications can be obtained.

The polyanion structural moiety is composed of a center atom covalently bonded to a plurality of oxygen atoms. Because the center atom and the oxygen atoms are covalently bonded, a high electrochemical stability can be achieved. In this embodiment, in order to be able to form stable covalent bonds, it is preferable for the difference between the electronegativity of the center atom and the electronegativity of the oxygen atoms to be 1.7 or less. Here, in Pauling electronegativity, given that the electronegativity of an oxygen atom is 3.44, it is preferable for the electronegativity of the center atom in the polyanion structural moiety to be 1.74 or more. In this embodiment, in order to form more stable covalent bonds, it is desirable for the center atom to have an electronegativity of more preferably 1.8 or more., and even more preferably 1.9 or more. For the sake of reference, the Pauling electronegativities of the elements belonging to groups 12 to 16 of the Periodic Table are shown below. Although not shown in the following table, the electronegativity of the element niobium, which is used in common niobium oxides (e.g., $LiNbO_3$) is 1.60.

TABLE 1

| | | Group | | | | |
| --- | --- | --- | --- | --- | --- | --- |
| | | 12 | 13 | 14 | 15 | 16 |
| Period | 2 | | B 2.04 | C 2.55 | N 3.04 | O 3.44 |
| | 3 | | Al 1.61 | Si 1.90 | P 2.19 | S 2.58 |
| | 4 | Zn 1.65 | Ga 1.81 | Ge 2.01 | As 2.18 | Se 2.55 |
| | 5 | Cd 1.69 | In 1.78 | Sn 1.96 | Sb 2.05 | Te 2.10 |
| | 6 | Hg 2.00 | Tl 1.62 | Pb 2.33 | Bi 2.02 | Po 2.00 |

The polyanion structural moiety in this embodiment is not subject to any particular limitation, provided it is composed of a center atom which is covalently bonded to a plurality of oxygen atoms. Illustrative examples include $PO_4^{3-}$, $SiO_4^{4-}$, $GeO_4^{4-}$ and $BO_3^{3-}$.

The reaction suppressor in this embodiment may be made of a composite compound of the above-described polyanion structure-containing compounds. Any combinations of the above polyanion anion-containing compounds may be employed as such a composite compound. Illustrative examples include $Li_3PO_4$—$Li_4SiO_4$, $Li_3BO_3$—$Li4SiO4$ and $Li_3PO_4$—$Li_3GeO_4$. Such composite compounds may be formed by preparing a target having a plurality of polyanion structure-containing compounds, and carrying out a Plasma Vapor Deposition (PVD) process (e.g., Pulsed Laser Deposition (PLD) process, sputtering process) using the target. Alternatively, use may be made of a liquid phase process such as a sol-gel process, or a mechanical milling process such as a ball milling process.

The reaction suppressor in this embodiment is preferably one composed of a non-crystalline polyanion structure-containing compound. By using a non-crystalline polyanion structure-containing compound, a thin, uniform reaction suppressor can be formed, increasing the coverage and making it possible to fully achieve the objects of the invention. Because the non-crystalline polyanion structure-containing compound has a high ionic conductivity, by using the composite positive electrode active material of this embodiment in an all solid-state battery, a higher battery output can be achieved. The non-crystalline polyanion moiety-containing compound of the invention can be confirmed by X-Ray Diffraction (XRD) analysis.

When the composite positive electrode active material of this embodiment is used in an all solid-state battery, it is preferable for the reaction suppressor formed by covering the surface of the positive electrode active material to have a thickness which is of a degree such that reactions between the positive electrode active material and the solid electrolyte material do not arise, such as preferably in a range of from 1 nm to 500 nm, and more preferably in a range of from 2 nm to 100 nm. If the thickness of the reaction suppressor is too small, there is a possibility that the positive electrode active material and the solid electrolyte material will react. On the other hand, if the reaction suppressor has too large a thickness, there is a possibility that the ion conductivity will decrease. To more fully achieve the intended objects and effects of the invention, it is more preferable for the reaction suppressor to cover a larger surface area of the positive electrode active material, and even more preferable for the reaction suppressor to cover the entire surface area of the positive electrode active material. Specifically, the coverage by the reaction suppressor formed so as to cover the surface of the positive electrode active material is preferably 20% or more, and more preferably 50% or more.

Illustrative examples of the method used to form the reaction suppressor in this embodiment include rotating fluidized-bed coating (a sol-gel process), mechanofusion, Chemical Vapor Deposition (CVD) processes and PVD processes.

(3. Transition Metal-Reducing Layer)

Next, the transition metal-reducing layer in this embodiment is described. The transition metal-reducing layer in this embodiment self-assembles by the reaction of the transition metal with the polyanion structure-containing compound at the interface between the positive electrode active material and the reaction suppressor. By carrying out heat treatment when the reaction suppressor is formed in such a way as to cover the surface of the positive electrode active material, the transition metal at the surface of the positive electrode active material and the polyanion structural moiety in the reaction suppressor react at an elevated temperature, lowering the valence of the transition metal at the surface of the positive electrode active material compared with the valence of the transition metal at the interior (bulk portion) of the positive electrode active material. In this embodiment, such a region where the valence of the transition metal at the surface of the positive electrode active material has been lowered in this way is referred to as a "transition metal-reducing layer." The thickness of the transition metal-reducing layer in this embodiment is 10 nm or less, preferably 5 nm or less, and more preferably 1 nm or less. It is especially preferable for a transition metal-reducing layer to not have formed. If the transition metal-reducing layer is too thick, the interfacial resistance between the reaction suppressor and the positive electrode active material becomes large.

The thickness of the transition metal-reducing layer varies according to the temperature of heat treatment when forming the reaction suppressor so as to cover the surface of the positive electrode active material. Generally, the higher the temperature of the above heat treatment, the greater the thickness of the transition metal-reducing layer. Conversely, the lower the temperature of heat treatment, the smaller the thickness of the transition metal-reducing layer. In this embodiment, the temperature of the above heat treatment is set in such a way as to result in a transition metal-reducing layer having a thickness of 10 nm or less.

(4. Composite Positive Electrode Active Material)

The method for manufacturing the composite positive electrode active material of this invention may be any method which is capable of obtaining the above-described composite positive electrode active material, and is not subject to any particular limitation. An illustrative example is the subsequently described "C. Method for Manufacturing a Composite Positive Electrode Active Material." Moreover, the composite positive electrode active material of this embodiment is preferably used as the positive electrode active material for an all solid-state battery, the reason being that the interfacial resistance between the positive electrode active material and the solid electrolyte material can he lowered and the increase over time in the interfacial resistance between the positive electrode active material and the solid electrolyte material can be suppressed. In this way, an all solid-state battery having excellent output characteristics and durability can be obtained.

(B. All Solid-State Battery)

Next, an embodiment of the all solid-state battery of the invention is described. The all solid-state battery of the invention has a positive electrode active material layer, a negative electrode active material layer, and a solid electrolyte layer formed between the positive electrode active material layer and the negative electrode active material layer. The positive electrode active material layer is characterized by including the above-described composite positive electrode active material, and is also characterized in that the composite positive electrode active material is in contact with a high-resistance layer-forming solid electrolyte material that reacts with the positive electrode active material to form a high-resistance layer.

Figure 2:
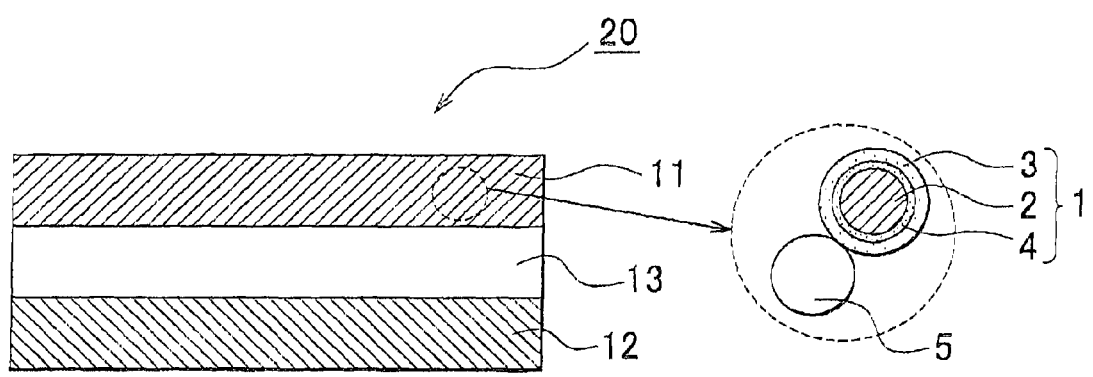
FIG. 2 is an explanatory diagram showing an embodiment of the all solid-state battery of the invention.

FIG. 2 is an explanatory diagram showing an embodiment of a power-generating element in the all solid-state battery of the invention. The power-generating element 20 shown in FIG. 2 has a negative electrode active material layer 12, a positive electrode active material layer 11, and a solid electrolyte layer 13 formed between the positive electrode active material layer 11 and the negative electrode active material layer 12. In addition, the positive electrode active material layer 11 has a composite positive electrode active material 1 and a high-resistance layer-forming solid electrolyte material 5 which reacts with the positive electrode active material 2 to form a high-resistance layer. In FIG. 2, a transition metal-reducing layer 4 having a thickness of 10 nm or less has formed at the surface of the positive electrode active material 2 which comes into contact with the reaction suppressor 3, and the reaction suppressor 3 is made of a polyanion structure-containing compound (e.g., $Li_3PO_4$).

In this embodiment, by using the above-described composite positive electrode active material, the interfacial resistance between the reaction suppressor and the positive electrode active material can be reduced. Accordingly, the interfacial resistance between the composite positive electrode active material and the solid electrolyte material can be reduced, making it possible to achieve a high-output all solid-state battery. Moreover, because a reaction suppressor composed of a polyanion structure-containing compound having a high electrochemical stability is present at the interface between the positive electrode active material and the high-resistance layer-forming solid electrolyte material, the reaction suppressor is able to suppress the reaction of the positive electrode active material with the high-resistance layer-forming solid electrolyte material. In this way, an increase over time in the interfacial resistance between the positive electrode active material and the solid electrolyte material can be suppressed, enabling an all solid-state battery having an excellent durability to be obtained. The all solid-state battery of this embodiment is described below component by component.

(1. Positive Electrode Active Material Layer)

First, the positive electrode active material layer in this embodiment is described. The positive electrode active material layer in this embodiment is a layer containing at least the above-described composite positive electrode active material. It may optionally include at least one of a solid electrolyte material an a conductive material.

In this embodiment, in order to be able to increase the ionic conductivity of the positive electrode active material layer, it is especially preferable for the solid electrolyte material included in the positive electrode active material layer to be a high-resistance layer-forming solid electrolyte material.

(1-1. Composite Positive Electrode Active Material)

Because the composite positive electrode active material used in this embodiment is essentially the same as that in the above-described "A. Composite Positive Electrode Active Material," a description is omitted here. The content of the composite positive electrode active material in the positive electrode active material layer is preferably in a range of from 10 mass % to 99 mass %, and more preferably in a range of from 20 mass % to 90 mass %.

(1-2. High-Resistance Layer-Forming Solid Electrolyte Material)

In the present embodiment, to enhance the ionic conductivity of the positive electrode active material layer, the positive electrode active material layer preferably includes a high-resistance layer-forming solid electrolyte material. The high-resistance layer-forming solid electrolyte material used in this embodiment generally reacts with the above-described positive electrode active material to form a high-resistance layer. Formation of the high-resistance layer can be confirmed by Transmission Electron Microscopy (TEM) or Energy Dispersive X-ray spectroscopy (EDX).

In this embodiment, it is preferable for the high-resistance layer-forming solid electrolyte material to include a crosslinked chalcogen, the reason being that the ionic conductivity is high and the ionic conductivity of the positive electrode active material layer can be enhanced, making it possible to achieve a higher battery output. On the other hand, in crosslinked chalcogen-containing solid electrolyte materials, because crosslinked chalcogen has a relatively low electrochemical stability, it reacts with common reaction suppressors (e.g., reaction suppressors made of $LiNbO_3$) and tends to form a high-resistance layer, which is believed to lead to a marked rise over time in the interfacial resistance. By contrast, because the reaction suppressor in this embodiment has a high electrochemical stability, the reaction suppressor does not readily react with a crosslinked chalcogen-containing solid electrolyte material, and is thus able to suppress formation of a high-resistance layer. It is thought that, in this way, an increase over time in the interfacial resistance can be suppressed while the ion conductivity is increased.

In this embodiment, in order to obtain a solid electrolyte material having an excellent ionic conductivity, the above crosslinked chalcogen is preferably crosslinked sulfur (—S—) or crosslinked oxygen (—O—), and more preferably crosslinked sulfur. Illustrative examples of crosslinked sulfur-containing solid electrolyte materials include $Li—P_3S_{11}$, $0.6Li_2S-0.4SiS_2$ and $0.6Li_2S-0.4GeS_2$. Here, $Li_7P_3S_{11}$ is a solid electrolyte material having a $PS_3—S—PS_3$ structure and a $PS_4$ structure, the $PS_3—S—PS_3$ structure containing crosslinked sulfur. Thus, in this embodiment, to fully achieve the objects of the invention, it is preferable for the high-resistance layer-forming solid electrolyte material to have a $PS_3—S—PS_3$ structure. Illustrative examples of solid electrolyte materials containing a crosslinked oxygen include $95(0.6Li_2S-0.4SiS_2)-5Li_4SiO_4$, $95(0.67Li_2S-0.33P_2S_5)-5Li_3PO_4$ and $95(0.6Li_2S-0.4GeS_2)-5Li_3PO_4$.

In cases where the high-resistance layer-forming solid electrolyte material is a material which does not contain a crosslinked chalcogen, illustrative examples include $Li_{1.3}Al_{0.3}Ti_1—(PO_4)_3$, $Li_{1.3}Al_{0.3}Ge_{1.7}(PO_4)_3$, $0.8Li_2S-0.2P_2S_5$ and $Li_{3.25}Ge_{0.25}P_{0.75}S_4$. In this embodiment, a sulfide solid electrolyte material or an oxide solid electrolyte material may be used as the high-resistance layer-forming solid electrolyte material.

The high-resistance layer-forming solid electrolyte material may be in the form of particles, for example. Of these, spherical or spheroidal particles are preferred. In cases where the high-resistance layer-forming solid electrolyte material is in a particulate form, the average particle size is preferably within a range of from 0.1 µm to 50 µm. The content of the high-resistance layer-forming solid electrolyte material in the positive electrode active material layer is preferably in a range of from 1 mass % to 90 mass % and more preferably in a range of from 10 mass % to 80 mass %

In this embodiment, the above-described reaction suppressor may be formed in such a way as to cover the surface of the high-resistance layer-forming solid electrolyte material.

(1-3. Positive Electrode Active Material Layer)

The positive electrode active material layer in this embodiment may also include a conductive material. By adding a conductive material, the conductivity of the positive electrode active material layer can be improved. Illustrative examples of conductive materials include acetylene black, Ketjenblack and carbon fibers. The content of the conductive material in the positive electrode active material layer, although not subject to any particular limitation, is preferably in a range of from 0.1 mass % to 20 mass %, The thickness of the positive electrode active material layer varies according to the intended object and the type of the all solid-state battery, but is preferably in a range of, for example, from 1 µm 100 µm.

(2. Solid Electrolyte Layer)

Next, the solid electrolyte layer in this embodiment is described. The solid electrolyte layer in this embodiment is a layer which includes at least a solid electrolyte material. As explained above, in cases where the positive electrode active material layer includes a high-resistance layer-forming solid electrolyte material, the solid electrolyte material used in the solid electrolyte layer is not subject to any particular limitation, and may be a high-resistance layer-forming solid electrolyte material or may be some other type of solid electrolyte material. On the other hand, in cases where the positive electrode active material layer does not include a high-resistance layer-forming solid electrolyte material, the solid electrolyte layer generally includes a high-resistance layer-forming solid electrolyte material. In particular, in this embodiment, it is advantageous for both the positive electrode active material layer and the solid electrolyte layer to contain a high-resistance layer-forming solid electrolyte material because the desired objects and effects of the invention can thereby be fully achieved. Also it is advantageous for the solid electrolyte material used in the solid electrolyte layer to be solely a high-resistance layer-forming solid electrolyte material.

The high-resistance layer-forming solid electrolyte material is essentially the same as that in the above-described "1, Positive Electrode Active Material Layer." Regarding a solid electrolyte material other than a high-resistance layer-forming solid electrolyte material, a material similar to the solid electrolyte material used in ordinary all solid-state batteries may be used.

In this embodiment, in cases where the solid electrolyte layer includes a high-resistance layer-forming solid electrolyte material, the composite positive electrode active material of the positive electrode active material layer and the high-resistance layer-forming solid electrolyte material of the solid electrolyte layer come into mutual contact. At this time, it is acceptable for a reaction suppressor to be formed so as to cover the surface of the high-resistance layer-forming solid electrolyte material, or for a reaction suppressor to not be formed.

The solid electrolyte layer in this embodiment has a thickness in a range of, for example, preferably from 0.1 μm to 1,000 μm, and more preferably from 0.1 μm to 300 μm.

(3. Negative Electrode Active Material Layer)

Next, the negative electrode active material layer in this embodiment is described. The negative electrode active material layer in this embodiment is a layer which includes at least a negative electrode active material, and which may optionally include at least one of a solid electrolyte material and a conductive material. The negative electrode active material varies depending on the type of conducting ion in the target all solid-state battery, and is exemplified by metallic active materials and carbonaceous active materials. Illustrative examples of metallic active materials include indium, aluminum silicon and tin. Illustrative examples of carbonaceous active materials include MesoCarbon MicroBeads (MCMB), Highly Oriented Pyrolytic Graphite (HOPG), bard carbon and soft carbon. The solid electrolyte material and the conductive material used in the negative electrode active material layer are similar to those used in the above-described positive electrode active material. The negative electrode active material layer has a thickness in a range of, for example, from 1 μm to 200 μm.

(4. Other Components)

The all solid-state battery of this embodiment includes at least the above-described positive electrode active material layer, solid electrolyte layer and negative electrode active material layer. In addition, it generally includes a positive electrode current collector which carries out positive electrode active material layer current collection, and a negative electrode current collector which carries out negative electrode active material layer current collection. Illustrative examples of the positive electrode current collector material include SUS stainless steel, aluminum, nickel, iron, titanium and carbon. Of these SUS stainless steel is preferred. Illustrative examples of the negative electrode current collector material include SUS stainless steel, copper, nickel and carbon. Of these SUS stainless steel is preferred. It is preferable for the thickness, shape and other characteristics of the positive electrode current collector and the negative electrode current collector to be suitably selected according to such considerations as the intended use of the all solid-state battery. An ordinary battery case for all solid-state batteries may be used as the battery case employed in this embodiment. Illustrative examples of the battery case include battery cases made of SUS stainless steel. In the all solid-state battery of this embodiment, the power-generating element may be one that is formed at the interior of an insulating ring.

(5. All Solid-State Battery)

In this embodiment, by using the above-described composite positive electrode active material, because this includes a reaction suppressor made of a polyanion structure-containing compound which has a high electrochemical stability at the interface between the positive electrode active material and the solid electrolyte material, the type of conducting ion is not subject to any particular limitation. Illustrative examples of the type of all solid-state battery in this embodiment include all solid-state lithium batteries, all solid-state sodium batteries, all solid-state magnesium batteries and all solid-state calcium batteries. Of these, all solid-state lithium batteries and all solid-state sodium batteries are preferred. All solid-state lithium batteries are especially preferred. The all solid-state battery of this embodiment may be a primary battery or a secondary battery, although it is preferably a secondary battery because such a battery can be repeatedly charged and discharged, making it useful as, for example, an automotive battery. Illustrative examples of the shape of the all solid-state battery of this embodiment include coin-type, laminated, tubular, and rectangular batteries. Of these, rectangular and laminated batteries are preferred, and laminated batteries are especially preferred.

No particular limitation is imposed on the method for manufacturing the all solid-state battery of this embodiment, provided the method is one which is capable of obtaining the above-described all solid-state battery. Use may be made of a method similar to an ordinary method for manufacturing all solid-state batteries. One embodiment of a method for manufacturing an all solid-state battery is explained in detail in the subsequently described "D. Method for Manufacturing an All Solid-State Battery."

(C. Method for Manufacturing Composite Positive Electrode Active Material)

Next, an embodiment of the inventive method for manufacturing a composite positive electrode active material is described. The inventive method for manufacturing a composite positive electrode active material is a method for manufacturing a composite positive electrode active material which includes a transition metal-containing positive electrode active material and a reaction suppressor which is formed so as to cover a surface of the positive electrode active material and which is made of a polyanion structure-containing compound having a cation moiety composed of a metal atom that becomes a conducting ion and having a polyanion structural moiety composed of a center atom that is covalently bonded to a plurality of oxygen atoms. This method is Characterized by including the steps of preparing a reaction suppressor-forming coating solution which includes a hydrolyzable metal compound having the cation moiety and a compound having the polyanion structural moiety (referred to subsequently as "the preparation step of this embodiment"), covering the surface of the positive electrode active material with the reaction suppressor-forming coating solution (referred to subsequently as "the covering step of this embodiment"), and heat-treating, at a temperature of 300° C. or less, the positive electrode active material that has been covered on the surface thereof with the reaction suppressor-forming coating solution, so as form the reaction suppressor (referred to subsequently as "the heat treatment step of this embodiment").

In this invention, by using heat treatment at a predetermined temperature to form a reaction suppressor in such a way as to cover the surface of the positive electrode active material, the transition metal-reducing layer that has formed on the surface of the positive electrode active material in contact with the reaction suppressor can be made thin, making it possible to obtain a composite positive electrode active material that is able to reduce the interfacial resistance between the reaction suppressor and the positive electrode active material. In this way, when the composite positive electrode active material obtained according to this invention is used in an all solid-state battery, the interfacial resistance between the composite positive electrode active material and the solid electrolyte material can be lowered. Also, because the surface of the positive electrode active material is covered by the reaction suppressor composed of a polyanion structure-containing compound having a high electrochemical stability, by using the composite positive electrode active material obtained according to this invention in an all solid-state battery, a rise over time in the interfacial resistance between the positive electrode active material and the solid electrolyte material can be suppressed.

Figure 3:
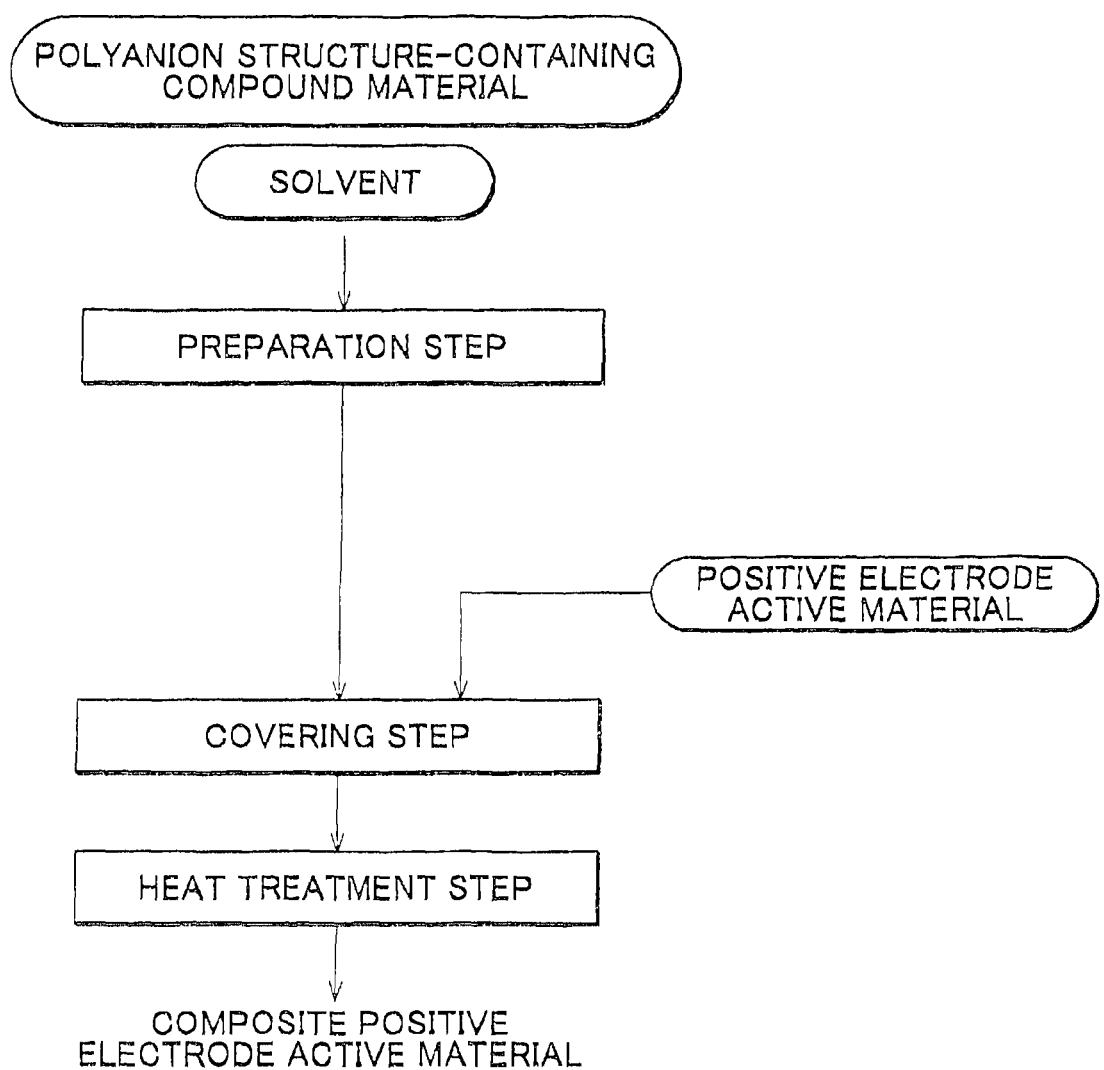
FIG. 3 is a flow chart showing an embodiment of the inventive method for manufacturing a composite positive electrode active material.

FIG. 3 is a flow chart illustrating an embodiment of the inventive method for manufacturing a composite positive electrode active material. In FIG. 3, first a reaction suppressor-forming coating solution is prepared, which solution includes a hydrolyzable metal compound having a cation moiety composed of a metal atom which becomes a conducting ion and a compound having a polyanion structural moiety composed of a center atom covalently bonded to a plurality of oxygen atoms (preparation step). The surface of the transition metal-containing positive electrode active material is then covered with the reaction suppressor-forming coating solution (covering step). Next, the positive electrode active material which has been covered on the surface thereof with the reaction suppressor-forming coating solution is heat-treated at a temperature of 300° C. or less to form a reaction suppressor (heat treatment step). In this way, there can be obtained a composite positive electrode active material composed of a transition metal-containing positive electrode active material and a reaction suppressor which is formed so as to cover a surface of the positive electrode active material and which is made of a polyanion structure-containing compound having a cation moiety composed of a metal atom that becomes a conducting ion and having a polyanion structural moiety composed of a center atom that is covalently bonded to a plurality of oxygen atoms. The method for manufacturing a composite positive electrode active material according to this embodiment is described below step by step.

(1. Preparation Step)

First, the preparation step in this embodiment is described. The preparation step in this embodiment is a step in which a reaction suppressor-forming coating solution is prepared, which solution includes a hydrolyzable compound having a cation moiety composed of a metal atom that becomes a conducting ion, and also includes a compound having a polyanion structural moiety composed of a center atom covalently bonded to a plurality of oxygen atoms or a compound that forms such a polyanion structural moiety by reaction. The reaction suppressor-forming coating solution prepared by this step becomes a sol via hydrolysis and polycondensation reactions on the above-described compounds included therein, and becomes gelatinous when the polycondensation reaction and agglomeration proceed further. Because the cation moiety and the polyanion structural moiety are substantially the same as those described under "A. Composite Positive Electrode Active Material," a description is omitted here.

The hydrolyzable metal compound having a cation moiety which is used in this step contains a cation moiety composed of a metal atom that becomes a conducting ion. The compound is not subject to any particular limitation, provided it is a metal compound which is hydrolyzable, and may differ according to the target composite positive electrode active material. The hydrolyzable metal compound having such a cation moiety is exemplified by metal alkoxides. Illustrative examples of metal alkoxides, in cases where the cation moiety is $Li^+$, include lithium ethoxide, lithium methoxide and lithium propoxide. The concentration of the hydrolyzable metal compound having a cation moiety which is included in the reaction suppressor-forming coating solution is suitably selected according to the target composite positive electrode active material.

The compound having a polyanion structural moiety used in this step is not subject to any particular limitation, provided it has a polyanion structural moiety composed of a center atom covalently bonded to a plurality of oxygen atoms, and may differ depending on the target composite positive electrode active material. In cases where the polyanion structural moiety is $PO_4^{3-}$, the compound having such a polyanion structural moiety is exemplified by phosphoric acid esters. Illustrative examples of phosphoric acid esters include triethyl phosphate and trimethyl phosphate. In cases where the polyanion structural moiety is $SiO_4^{4-}$, the compound having a polyanion structural moiety is exemplified by silane alkoxides. Illustrative examples of silane alkoxides include tetraethoxysilane and tetramethoxysilane. The concentration of the compound having a polyanion structural moiety which is included in the reaction suppressor-forming coating solution is suitably selected according to the target composite positive electrode active material.

In this step, the reaction suppressor-forming coating solution is generally prepared by dissolving or dispersing the hydrolyzable metal compound having a cation moiety and the compound having a polyanion structural moiety in a solvent. The solvent used in this step is not subject to any particular limitation, provided it is able to dissolve or disperse the hydrolyzable metal compound having a cation moiety and the compound having a polyanion structural moiety, and provided it can be removed at a temperature of 300° C. or less. Illustrative examples include ethanol, propanol and methanol.

In this step, any additive may be optionally added to the reaction suppressor-forming coating solution.

(2. Covering Step)

Next, the covering step in this embodiment is described. The covering step in this embodiment is a step in which the surface of the transition metal-containing positive electrode active material is covered with a reaction suppressor-forming coating solution. As described above, the reaction suppressor-forming coating solution prepared in the preparation step passes through a sol state and enters a gelatinous state. In this step, the gelatinous reaction suppressor-forming coating solution is coated onto and covers the surface of the positive electrode active material. Because the transition metal-containing positive electrode active material used may be substantially the same as that described under "A. Composition Positive Electrode Active Material," a description is omitted here.

In this step, the film thickness of the reaction suppressor-forming coating solution which covers the surface of the positive electrode active material is suitably selected according to the target thickness of the reaction suppressor and is preferably, for example, in a range of from 0.1 nm to 500 nm, and more preferably in a range of from 1 nm to 100 nm. In this step, the surface of the positive electrode active material is covered with a reaction suppressor-forming coating solution. However, to better achieve the objects and effects of this invention, it is preferable to cover more of the surface area of the positive electrode active material, and more preferable to cover all the surface of the positive electrode active material. Specifically, the reaction suppressor-forming coating solution which covers the surface of the positive electrode active material has a coverage of preferably 20% or more, and more preferably 50% or more.

In this step, after the surface of the positive electrode active material has been covered with the reaction suppressor-forming coating solution, the positive electrode active material may be dried with hot air. By removing the solvent through drying in this way, a reaction suppressor which covers the surface of the positive electrode active material can be efficiently formed in the subsequently described heat treatment step.

(3. Heat Treatment Step)

Next, the heat treatment step in this embodiment is described. The heat treatment step in this embodiment is a step wherein the positive electrode active material that has been covered on the surface thereof with a reaction suppressor-forming coating solution is heat-treated at a temperature of 300° C. or less and formed so as to cover the surface of the positive electrode active material, thereby forming a reaction suppressor composed of a polyanion structure-containing compound having the above-described cation moiety and the above-described polyanion structural moiety. In this step, carrying out heat treatment removes the solvent remaining at the interior of the gelatinous reaction suppressor-forming coating solution that has been applied in the covering step and promotes densification, creating a thin film (reaction suppressor) which covers the surface of the positive electrode active material.

In this step, by heat-treating at a temperature of 300° C. or less the positive electrode active material which has been covered on the surface thereof with a reaction suppressor-forming coating solution, reactions between the positive electrode active material and the reaction suppressor can be suppressed, enabling the thickness of the transition metal-reducing layer formed on the surface of the positive electrode active material in contact with the reaction suppressor to be set to 10 nm or less. In this way, the interfacial resistance between the reaction suppressor and the positive electrode active material can be reduced. The heat treatment temperature in this step is 300° C. or less, and is preferably set in a range of from 150° C. to 300° C., and more preferably set in a range of from 200° C. to 300° C.

The heat treatment time in this step is typically in a range of from 0.5 hours to 48 hours, and preferably in a range of from 1 hour to 10 hours.

The heat treatment atmosphere in this step is not subject to any particular limitation, provided it is an atmosphere in which the target reaction suppressor may be formed and is not an atmosphere which is detrimental to the composite positive electrode active material. Illustrative examples include inert gas atmospheres such as an open-air atmosphere, a nitrogen atmosphere or an argon atmosphere; reducing atmospheres such as an ammonia atmosphere, a hydrogen atmosphere or a carbon monoxide atmosphere; and a vacuum.

(4. Other Steps)

In this embodiment, by passing through the above steps, a composite positive electrode active material in which a reaction suppressor has been formed so as to cover the surface of a positive electrode active material can be obtained by a sol-gel process. Because the sol-gel process is a wet process which uses a solvent-based precursor, the reaction suppressor can easily be formed so as to cover more of the surface area of the positive electrode active material surface. Moreover, because the sol-gel process is a chemical process, compared with a process that involves covering the surface of the positive electrode active material by means of physical forces which are mechanical, such as a mechanical milling process, the bonds between the positive electrode active material and the reaction suppressor are strong, making it possible to obtain a composite positive electrode active material in which delamination of the reaction suppressor formed so as to cover the surface of the positive electrode active material does not readily occur.

(D. Method for Manufacturing an All Solid-State Battery)

Next, an embodiment of the inventive method for manufacturing an all solid-state battery is described. The inventive method for manufacturing an all solid-state battery is a method for manufacturing an all solid-state battery which has a positive electrode active material layer, a negative electrode active material layer, and a solid electrolyte layer formed between the positive electrode active material layer and the negative electrode active material layer. This method is characterized by including the step of forming the positive electrode active material layer by using a composition which includes the composite positive electrode active material produced by the above-described composite positive electrode active material manufacturing method (which step is the subsequently described positive electrode active material layer-forming step of this embodiment).

In this step, by using a composite positive electrode active material obtained by the above-described composite positive electrode active material manufacturing method, the interfacial resistance between the composite positive electrode active material and the solid electrolyte material can be reduced, enabling an all solid-state battery having a high output to be obtained. Moreover, an increase over time in the interfacial resistance between the positive electrode active material and the solid electrolyte material can be suppressed, enabling an all solid-state battery having excellent durability to be obtained. The method for manufacturing an all solid-state battery of the present embodiment is described below step by step.

(1. Positive Electrode Active Material Layer-Forming Step)

First, the positive electrode active material layer-forming step in this embodiment is described. The positive electrode active material layer-forming step in this embodiment is the step of forming a positive electrode active material layer by using a composition containing the composite positive electrode active material manufactured by the above-described composite positive electrode active material manufacturing method, The positive electrode active material layer-forming method is exemplified by a pressing method. Also, the composition may be one which includes the above-described composite positive electrode active material, and may optionally include at least one of a solid electrolyte material and a conductive material. Descriptions of the composite positive electrode active material, the solid electrolyte material, the conductive material, the thickness of the positive electrode active material layer and the like are omitted here because these are substantially the same as what has already been described above under "A. Composite Positive Electrode Active Material" and "B. All Solid-State Battery."

(2. Solid Electrolyte Layer-Forming Step)

In this embodiment, aside from the above-described step, a solid electrolyte layer-forming step which forms a solid electrolyte layer by using a solid electrolyte material is generally carried out. The solid electrolyte layer-forming method is exemplified by a pressing method. It suffices for this composition to include at least a solid electrolyte material, although it is preferable for this composition to include only a solid electrolyte material. Descriptions of the solid electrolyte material, the thickness of the solid electrolyte layer and the like are omitted here because these are substantially the same as what has already been described above under "B. All Solid-State Battery."

(3. Negative Electrode Active Material Layer-Forming Step)

In this embodiment, aside from the above steps, a negative electrode active material layer-forming step which uses a negative electrode active material-containing composition to form a negative electrode active material layer is generally carried out. The negative electrode active material layer-forming method is exemplified by a pressing method. The above composition is one which includes a negative electrode active material, and may also optionally include at least one of a solid electrolyte material and a conductive material. Descriptions of the negative electrode active material, solid electrolyte material, conductive material, the thickness of the negative electrode active material layer and the like are omitted here because these are substantially the same as what has already been described above under "B. All Solid-State Battery."

(4. Other Steps)

Aside from the above-described steps, this embodiment may also include, for example, the steps of disposing a positive electrode current collector on a surface of the positive electrode active material layer, disposing a negative electrode current collector on a surface of the negative electrode active material layer, and placing a power-generating element within a battery case. Descriptions of the positive electrode current collector, the negative electrode current collector, the battery case and the like are omitted here because these are substantially the same as what has already been described above under "B. All Solid-State Battery."

The invention is not limited to the foregoing embodiments, which have been provided here by way of illustration. It is to be understood that all other embodiments having an arrangement which is substantially the same as the technical concepts set forth in the claims and exhibiting similar effects and advantages are encompassed by the technical scope of this invention.

The invention is described more fully in the following examples.

EXAMPLE 1

(Production of a Composite Positive Electrode Active Material)

First, a reaction suppressor-forming coating solution was prepared by mixing lithium ethoxide, triethyl phosphate and tetraethoxysilane in ethanol in such a way as to set the molar ratio Li:P:Si to 7:1:1. This reaction suppressor-forming coating solution was then coated onto a positive electrode active material ($LiCoO_2$) to a thickness of 10 nm with a coating apparatus that employs a rotating fluidized bed, and dried with hot air. Next, the $LiCoO_2$ powder on which the reaction suppressor-forming coating solution had been coated was heat-treated in the open air for 5 hours at 300° C., thereby forming a reaction suppressor composed of $Li_3PO_4$—$Li4SiO_4$ which had a thickness of 10 nm and a coverage of 50%. In this way, there was obtained a composite positive electrode active material composed of $LiCoO_2$ whose surface was covered with the above reaction suppressor.

(Production of an All Solid-State Lithium Secondary Battery)

First, $Li_7P_3S_{11}$ (a crosslinked sulfur-containing solid electrolyte material) was obtained by a method similar to the method described in Japanese Patent Application Publication No. 2005-228570 (JP-A-2005-223570). $Li_7P_3S_{11}$ is a solid electrolyte material having a $PS_3$—S—$PS_3$ structure and a $PS_3$ structure. Next, using a pressing machine, a power-generating element 20 like that shown in FIG. 2 above was produced. A positive electrode blend obtained by mixing the above composite positive electrode active material and $Li_7P_3S_{11}$ in a weight ratio of 7:3 was used as the positive electrode active material layer 11, indium foil was used as the material making up the negative electrode active material layer 12, and $Li_7P_3S_{11}$ was used as the material making up the solid electrolyte layer 13. Using this power-generating element, an all solid-state lithium secondary battery was obtained.

EXAMPLE 2

Other than setting the heat-treatment temperature during production of the composite positive electrode active material to 200° C., an all solid-state lithium secondary battery was obtained in the same way as in Example 1.

COMPARATIVE EXAMPLE 1

Other than setting the heat-treatment temperature during production of the composite positive electrode active material to 400° C., an all solid-state lithium secondary battery was obtained in the same way as in Example 1.

COMPARATIVE EXAMPLE 2

Other than carrying out production of the composite positive electrode active material as described below, an all solid-state lithium secondary battery was obtained in the same way as in Example 1. First, commercial $Li_3PO_4$ and $Li_4SiO_4$ were blended together in a 1:1 molar ratio, and the resulting blend was pressed into pellets. Using these pellets as a target, a reaction suppressor composed of $Li_3PO_4$—$Li_4SiO_4$ having a coverage of 50% was formed on the positive electrode active material ($LiCoO_2$) by the PLD process to a thickness of 20 nm. This gave a composite positive electrode active material which was composed of $LiCoO_2$ covered on the surface thereof with the above reaction suppressor.

COMPARATIVE EXAMPLE 3

Other than setting the heat-treatment temperature during production of the composite positive electrode active material to 350° C., an all solid-state lithium secondary battery was obtained in the same way as in Example 1.

(Evaluation 1)

Figure 4:
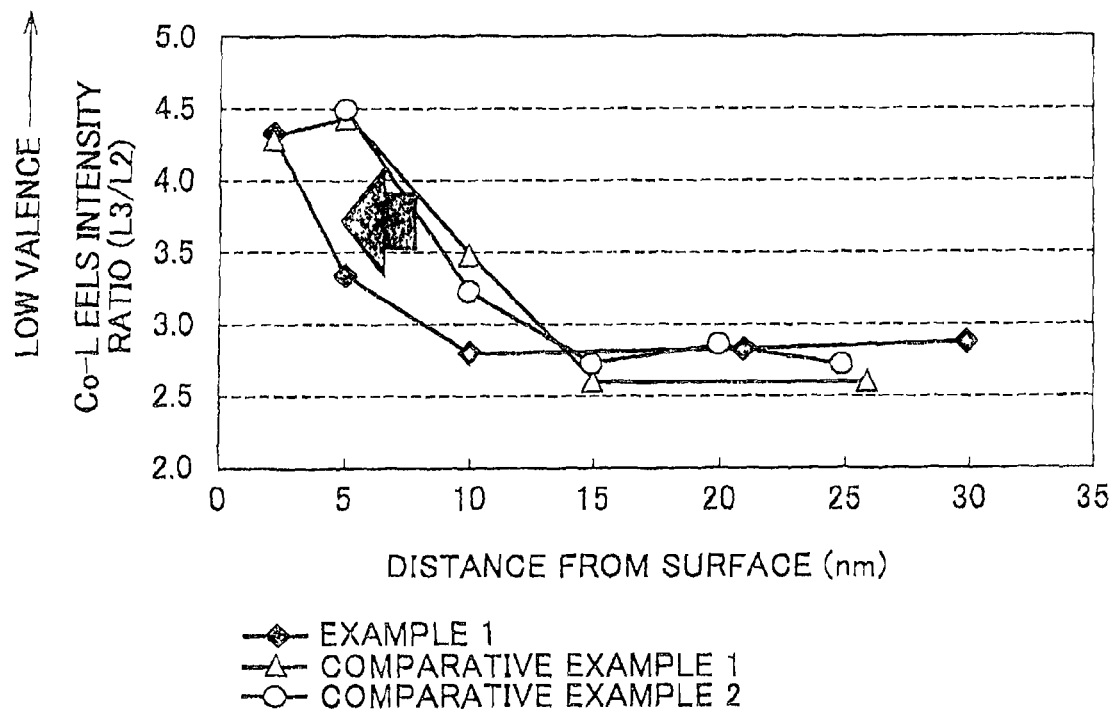
FIG. 4 is a graph showing the results of Electron Energy-Loss Spectroscopy in a Transmission Electron Microscope (TEM-EELS) measurements of composite positive electrode active materials obtained in Example 1 and Comparative Examples 1 and 2 of the invention.

Cross-sections of the composite positive electrode active materials obtained in Example 1 and Comparative Examples 1 and 2 were analyzed by TEM-EELS, and the cobalt valence near the $LiCoO_2$ surface in contact with $Li_3PO_4$—$Li_4SiO_4$ was determined. The results are shown in FIG. 4. It should be noted that, in FIG. 4, the value on the vertical axis becomes larger as the cobalt valence becomes smaller.

As shown in FIG. 4, compared with the composite positive electrode active materials in Comparative Examples 1 and 2, the distance from the surface to the boundary where the cobalt valence changes was confirmed to be small for the composite positive electrode active material in Example 1. As described above, because the transition metal-reducing layer is a region where the transition metal valence at the surface of the positive electrode active material has decreased relative to the transition metal valence at the interior (bulk) of the positive electrode active material, the thickness of the transition metal-reducing layer may be set as the distance from the surface to the boundary where the cobalt valence changes. Accordingly, the thickness of the transition metal-reducing layer in Example 1 was 10 nm, and the thickness of the transition metal-reducing layers in Comparative Examples 1 and 2 were 15 nm. The reason appears to be that, in Example 1, by covering the surface of the positive electrode active material with a reaction suppressor-forming coating solution via a sol-gel process (a coating method involving the use of a rotating fluidized bed) and carrying out heat treatment at a temperature of 300° C. or less, it was possible to make the thickness of the transition metal-reducing layer smaller than the thicknesses of this layer in Comparative Examples 1 and 2.

(Evaluation 2)

Using the all solid-state lithium secondary batteries obtained in Examples 1 and 2 and Comparative Examples 1 to 3, measurements of the interfacial resistance were carried out. First, charging of the all solid-state lithium secondary battery was carried out. Charging involved carrying out low-current charging at 3.34 V for 12 hours. After charging, the interfacial resistance between the positive electrode active material layer and the solid electrolyte layer was determined by impedance measurement. The impedance measurement conditions were set at a voltage amplitude of 10 mV, a measurement frequency of from 1 MHz to 0.1 Hz, and a temperature of 25° C. The results are shown in Table 2. Results other than those for Comparative Example 2 are shown in FIG. 5.

TABLE 2

| | Coating method | Heat treatment temperature | Thickness of transition metal-reducing layer | Interfacial resistance |
| --- | --- | --- | --- | --- |
| Example 1 | sol-gel process | 300° C. | 10 nm | 141 Ω |
| Example 2 | sol-gel process | 200° C. | | 164 Ω |
| Comp. Ex. 1 | sol-gel process | 400° C. | 15 nm | 334 Ω |
| Comp. Ex. 2 | PLD process | — | 15 nm | 731 Ω |
| Comp. Ex. 3 | sol-gel process | 350° C. | | 295 Ω |

Figure 5:
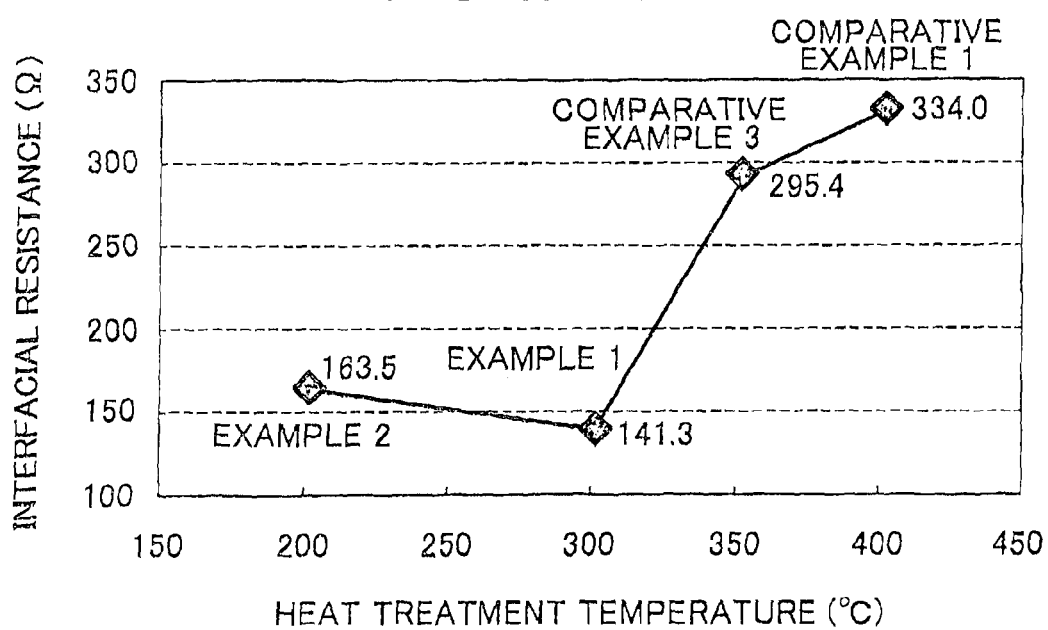
FIG. 5 is a graph showing the results of interfacial resistance measurements for all solid-state lithium secondary batteries obtained in Examples 1 and 2 and in Comparative Examples 1 and 3 of the invention.

As shown in Table 2 and FIG. 5, the all solid-state lithium secondary batteries of Examples 1 and 2 were confirmed to have low interfacial resistance values compared with the all solid-state lithium secondary batteries of Comparative Examples 1 to 3. The reason appears to be that, in Examples 1 and 2, by covering the surface of the positive electrode active material with a reaction suppressor-forming coating solution via a sol-gel process (a coating method involving the use of a rotating fluidized bed) and carrying out heat treatment at a temperature of 300° C. or less, it was possible to set the thickness of the transition metal-reducing layer to 10 nm or less.

The invention claimed is:

1. A composite positive electrode active comprising:
a positive electrode active material which includes a transition metal; and
a reaction suppressor layer which is formed so as to cover a surface of the positive electrode active material, and which is made of a polyatomic anion structure-containing compound having a cation moiety composed of a metal atom that becomes a conducting ion and having a polyatomic anion structural moiety composed of a center atom that is covalently bonded to a plurality of oxygen atoms; and
a transition metal-reducing layer which is self-assembled at the interface between the positive electrode active material and the reaction suppressor layer by the reaction of the transition metal with the polyatomic anion structure-containing compound, has a thickness of 10 nm or less, wherein
the reaction suppressor layer which is formed so as to cover a surface of the positive electrode active material is produced by carrying out a heat treatment, the heat treatment being at a temperature of 300° C. or less.
the metal atom in the cation moiety is selected from the group including alkali metal atoms and alkaline earth metal atoms, and
the center atom of the polyatomic anion structural moiety has a Pauling electronegativity of 1.74 or more.

2. The composite positive electrode active material according to claim 1, wherein the positive electrode active material is an oxide positive electrode active material.

3. The composite positive electrode active material according to claim 1, wherein the cation moiety is $Li^+$.

4. The composite positive electrode active material according to claim 1, wherein the polyatomic anion structural moiety is at least one selected from the group consisting of $PO_4^{3-}$, $SiO_4^{4-}$, $GeO_4^{4-}$ and $BO_3^{3-}$.

5. The composite positive electrode active material according to claim 4, wherein the polyatomic anion structural moiety is at least one selected from the group consisting of $PO_4^{3}$ and $SiO_4^{4-}$.

6. The composite positive electrode active material according to claim 1, wherein the reaction suppressor layer is made of a non-crystalline polyatomic anion structure-containing compound.

7. The composite positive electrode active material according to claim 1, wherein the reaction suppressor layer has a thickness in a range of from 1 nm to 500 nm.

8. The composite positive electrode active material according to claim 1, wherein the reaction suppressor layer which covers the surface of the positive electrode active material has a coverage of 50% or more.

9. An all solid-state battery comprising:
a positive electrode active material layer;
a negative electrode active material layer;
and a solid electrolyte layer formed between the positive electrode active material layer and the negative electrode active material layer, wherein
the positive electrode active material layer includes the composite positive electrode active material according to claim 1, and
the composite positive electrode active material is in contact with a high-resistance layer-forming solid electrolyte material which has property of forming a high-resistance layer when the high-resistance layer-forming solid electrolyte material reacts with the positive electrode active material.

10. The all solid-state battery according to claim 9, wherein the high- resistance layer-forming solid electrolyte material includes a crosslinked chalcogen.

11. The all solid-state battery of claim 10, wherein the crosslinked chalcogen is crosslinked sulfur or crosslinked oxygen.

12. The composite positive electrode active material according to claim 1, wherein the heat treatment is conducted at a temperature of 300° C.

13. The composite positive electrode active material according to claim 1, wherein the reaction suppressor layer which is formed so as to cover a surface of the positive electrode active material is obtained via a sol-gel process involving the use of a rotating fluidized bed.

14. The composite positive electrode active material according to claim 1, wherein the heat treatment is conducted at a temperature in the range of from 150° C. to 300° C.

15. The composite positive electrode active material according to claim 1, wherein the heat treatment is conducted at a temperature in the range of from 200° C. to 300° C.

\* \* \* \* \*